No. 888,712. PATENTED MAY 26, 1908.
G. KINDERMANN.
COMBINED WATER FILTER AND REGULATING TAP.
APPLICATION FILED MAR. 12, 1907.
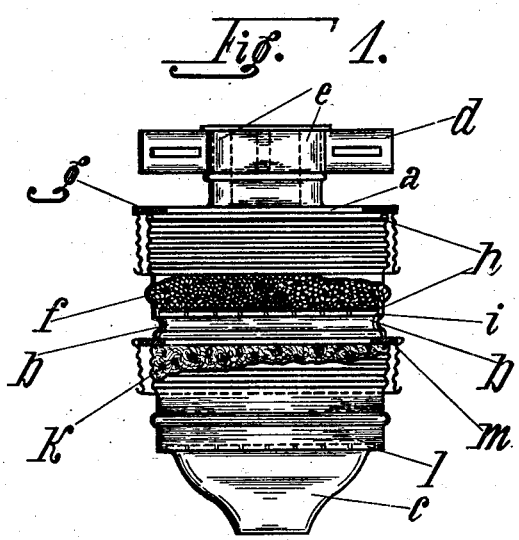
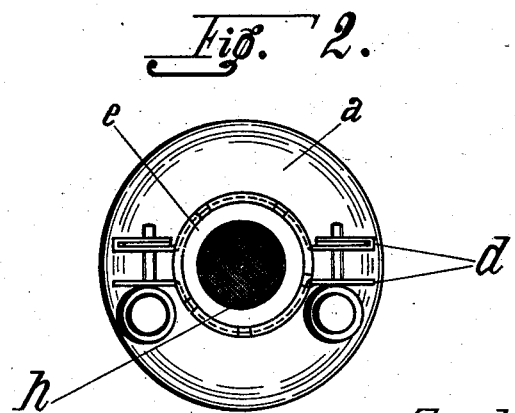
Witnesses:
Inventor:
Gustav Kindermann
THE NORRIS PETERS CO., WASHINGTON, D. C.

UNITED STATES PATENT OFFICE.

GUSTAV KINDERMANN, OF STETTIN, GERMANY.

COMBINED WATER FILTER AND REGULATING TAP.

No. 888,712.      Specification of Letters Patent.      Patented May 26, 1908.

Application filed March 12, 1907. Serial No. 361,985.

*To all whom it may concern:*

Be it known that I, GUSTAV KINDERMANN, builder, a citizen of the German Empire, and resident of Stettin, Germany, have invented a Combined Water Filter and Regulating Tap, of which the following is a specification.

The object of the present invention is a water filter in combination with a water regulating tap provided below the filter.

The apparatus by means of which water, conducting more or less mud can be excellently cleared, permits a simple exchanging of its interior parts, as the same are reachable by removing the upper and lower part of the filter.

The whole apparatus may easily be attached to any cocks or to the outlets of water conducting pipes by means of jaws.

In the annexed drawing, Figure 1 is a front elevation of the filter partly sectioned, and Fig. 2 is a plan.

The apparatus, having a cylindrical shape and being stamped out of metal, consists of the upper lid *a*, an intermediate piece *b* and the funnel *c*. It is attached to the water delivery pipes or cocks by means of a jaw *d* and insured against dropping off by a screw. The water tight joint is attained by the rubber ring *e*. The intermediate piece *b*, serving as a receptacle for the pebbles *f*, is air and water tight stuffed by means of the rubber ring *g* and is further provided with two wire sieves *h* in order to prevent the pebbles falling out of said intermediate piece *b*. The lower sieve *h* is strengthened by a perforated sheet of metal *i*, in order to prevent any bending of said sieve.

The funnel *c* serving also as a regulating tap, and being furnished with wadding *k*, is also provided with a perforated sheet of metal *l* in order to prevent the wadding falling out of position, and is further stuffed against the outflow of water, by means of the rubber ring *m*.

Instead of wadding, also felt may be used.

Having fully described my invention, what I claim and desire to secure by Letters Patent is:

In a combined filter and regulating tap, comprising a lid, an intermediate piece, and a funnel with rubber rings between the lid and the intermediate piece, and the intermediate piece and the funnel, the combination of two wire sieves in the intermediate piece, a perforated sheet for strengthening the lower sieve, pebbles between the two sieves, a perforated sheet of metal in the funnel, and a layer of wadding in the funnel on the said perforated sheet, substantially as described and shown and for the purpose set forth.

In testimony whereof I have hereunto set my hand, in the presence of two subscribing witnesses.

GUSTAV KINDERMANN.

Witnesses:
    WORST BIMER,
    WILLY LINHT.